United States Patent [19]

Pospisil

[11] Patent Number: 4,754,388

[45] Date of Patent: Jun. 28, 1988

[54] REGULATOR CIRCUIT FOR CONVERTING ALTERNATING INPUT TO A CONSTANT DIRECT OUTPUT

[75] Inventor: Robert S. Pospisil, Palm Bay, Fla.

[73] Assignee: Harris Corporation, Melbourne, Fla.

[21] Appl. No.: 944,399

[22] Filed: Dec. 19, 1986

Related U.S. Application Data

[63] Continuation of Ser. No. 754,712, Jul. 15, 1985, abandoned.

[51] Int. Cl.[4] .................... H02H 7/127; H02M 7/155; G05F 1/563

[52] U.S. Cl. ...................................... 363/54; 323/266; 323/300; 363/86; 363/89

[58] Field of Search ............... 323/266, 299, 300, 282, 323/284; 363/86, 89, 80, 81, 54

[56] References Cited

U.S. PATENT DOCUMENTS

| | | | |
|---|---|---|---|
| 3,373,344 | 3/1968 | Seer | 323/266 |
| 3,483,464 | 12/1969 | Embree et al. | 323/282 |
| 3,525,033 | 8/1970 | Greenberg et al. | 323/282 |
| 3,947,752 | 3/1976 | Morgan | 323/284 |
| 4,001,668 | 1/1977 | Lewis | 323/299 |
| 4,641,233 | 3/1987 | Roy | 323/299 |

FOREIGN PATENT DOCUMENTS

| | | | |
|---|---|---|---|
| 2062124 | 6/1972 | Fed. Rep. of Germany | 323/266 |
| 22491 | 6/1972 | Japan | 323/299 |
| 1047904 | 11/1966 | United Kingdom | 363/89 |

OTHER PUBLICATIONS

Derdall, "Switching Regulator with no Choke," IBM Tech. Disc. Bul., vol. 26, No. 6, Nov., 1983.

*Primary Examiner*—William H. Beha, Jr.

*Attorney, Agent, or Firm*—William A. Troner; Charles C. Krawczyk

[57] ABSTRACT

A high efficiency integrated power converter adapted for direct connection to line voltage and having on chip protection from overcurrent may be implemented utilizing a GTO-SCR as the switch element in a switching power converter such that the converter requires no external transformer or inductor based voltage reducing circuitry. The input voltage may vary over a wide dynamic range without deterioration in circuit performance due to the extremely high anode to cathode breakdown voltage of the switching element and further due to the on chip protection from excess current flow through the switching element.

22 Claims, 4 Drawing Sheets

REGULATOR CIRCUIT FOR CONVERTING ALTERNATING INPUT TO A CONSTANT DIRECT OUTPUT

This is a continuation of application Ser. No. 754,712, filed July 15, 1985, now abandoned.

FIELD OF THE INVENTION

The present invention provides a technique reducing electronic and electromechanical means to generate a stable and predetermined voltage or current source directly from an AC source of much higher magnitude without requiring transformers or other commonly used external voltage using means while providing extremely high power conversion efficiencies. More specifically, the present invention relates to the generation of a D.C. output from any AC source over a wide frequency range and capable of receiving voltages of greatly diverse magnitudes.

Existing techniques in the power supply art for converting power from an AC source at high voltage to a power source of significantly lower voltage dates back many years since almost every electronic circuit requires some predetermined voltage level. Existing power supply techniques can be grouped into three categories. First, simple transformer supplies which consist of a voltage reducing transformer, a rectifier and a regulator; second, simple zener referenced power supplies and filters which use a resistor or other current limiting means to reduce the incoming voltage to the desired level; and third, switch mode power supplies which provide voltage reduction using high efficiency electronic switching and inductors or toroidal transformers.

The present invention is of the third general type mentioned above. The following U.S. patents are illustrative of prior approaches using switch mode power supplies. Choi, U.S. Pat. No. 4,433,368, issued Feb. 21, 1984, discloses a switch mode power supply for use with an AC source. Referring to FIG. 2 thereof, the power supply comprises a rectifier, an SCR, a capacitor, a trigger circuit for controllng the SCR and a series connected ripple removing filter. This patent uses a choke coil (2) in series with the SCR firing circuit and is directed to the specific details of the ripple removing filter.

Scantlin, U.S. Pat. No. 3,769,573, issued Oct. 30, 1973, discloses a regulated power supply including a capacitor connected across the input of the voltage regulator and shows charging of the capacitor with current controlled by the selective gating of an SCR. A resistor and a zener diode are used to control the SCR conduction angle. Scantlin however has not protected his circuit from destruction in the event of excessive currents.

"On-Chip Power Supply for 110 V Line Input", by Pomper, Muller and Weidlich published December 1978 in IEEE Journal of Solid State Circuits is described in their abstract as: "An on-chip power supply in ESFI-SOS technology with only one external capacitor is presented. The circuit, which can directly be applied to 110 V ac line voltages, comprises a bridge rectifier, a "lambda"-type current switch, and a series regulator with overload protection. Because of the relatively small area consumption (6 mm$^2$) the circuit to be supplied can easily be integrated on the same chip. Experimental results show a dc output power of about 100 m$^W$ (10 V/10 mA). Due to the lambda-type current switching high efficiencies of more than 30 percent are achieved. With some additional device modifications to increase breakdown voltage it should be possible to operate such circuits also with 220 V ac line voltages.-"—IEEE Journal of Solid-State Circuits, Vol. SC-13, No. 6, December 1978, page 882.

It is noted that in the above article at page 885, an external transformer is used with the circuits disclosed and that the diodes utilized in the bridge rectifier result in a resistance of 180 ohms thus performing a substantial voltage reduction. Further, this voltage reduction is attributed to a thin epitaxial film which causes the high resistances in the diodes of the implementation disclosed. Still further, in the event that the external capacitor fails in the circuit disclosed, there is no current limiting means in the voltage pre-regulator thus leaving the circuit prone to destruction.

SUMMARY OF THE INVENTION

An object of the present invention is to provide a monolithic power supply.

Another object of the invention is to provide a power supply operated from the AC line without transformers or other external voltage reducing means.

Still another object of the invention is to provide a predetermined stable DC voltage or current source that is insensitive to the magnitude of the incoming AC power source over a wide range while providing overcurrent and overvoltage protection.

Still another object of the invention is to provide the pre-determined DC voltage or current source that is insensitive to the magnitude of the incoming power source and is provided using high efficiency switching techniques in a completely integrated form on one semiconductor chip.

A further object of the invention is to provide a uniquely compact power supply having high efficiency in widely varying applications.

Another object of the invention is to provide an unregulated DC source to the input of the series regulator, which then performs the precise regulation and further redundant short circuit protection as required by the application.

These and other objects of the present invention are attained by charging a capacitor using a direct current component of the incoming AC source at an increased number of transfer periods. The negative (or positive) terminal of the capacitor is connected in common to both the return side of the incoming line source and the return side of said power supply output terminal. The circuitry of the present invention may be implemented in a single semiconductor chip having the capability of being connected directly to any external AC or DC supply having at least as high a voltage as the desired output, and will handle widely varying voltage and current demands. As a result of on chip overvoltage and overcurrent protection, no peripheral protection circuitry is required.

DESCRIPTION OF THE PREFERRED EMBODIMENT

Figure 1:
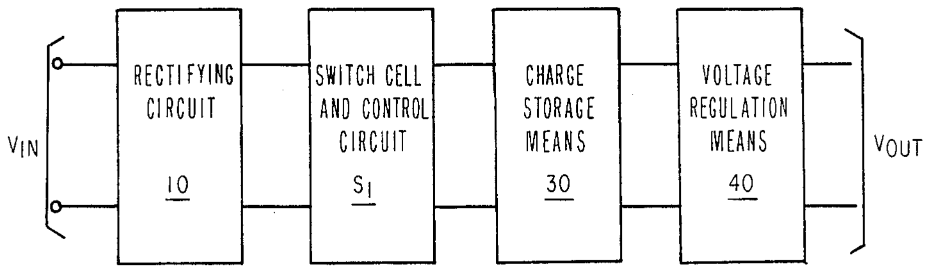
FIG. 1 is a block diagram showing the relative functional interconnections existing in the invention.

The complete power supply shown in FIG. 1, contains the basic functional elements of the invention. The first consists of the rectifier circuit 10. Next is the switch cell and control circuit (S1) which includes novel circuitry for implementing the subject of the invention. Also included are a charge storage means 30 and a voltage regulation means 40 which are shown to demonstrate one of the variety of applications possible with the present invention.

Figure 3:
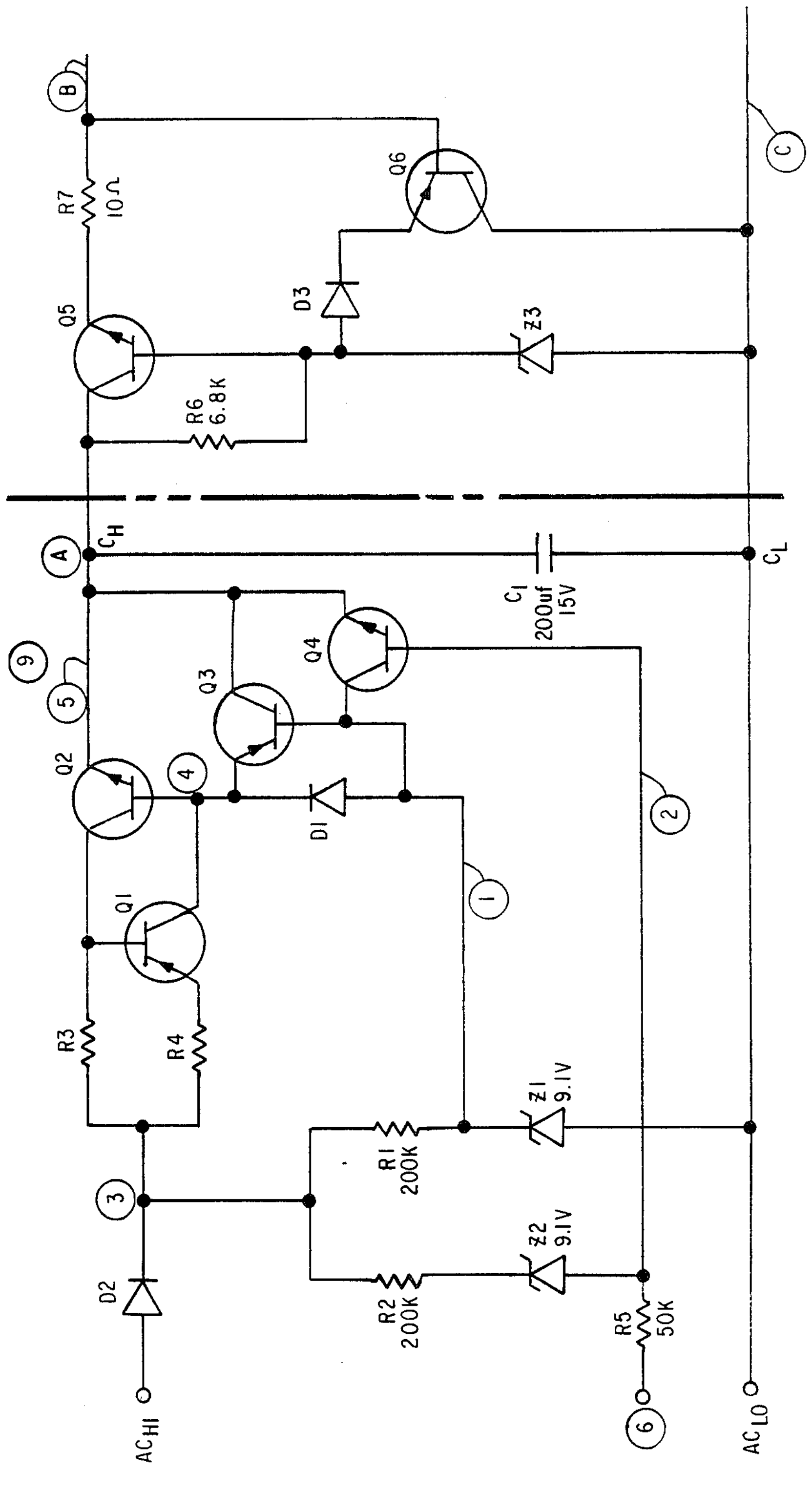
FIG. 3 is a schematic diagram of one embodiment of the invention.
Figure 4:
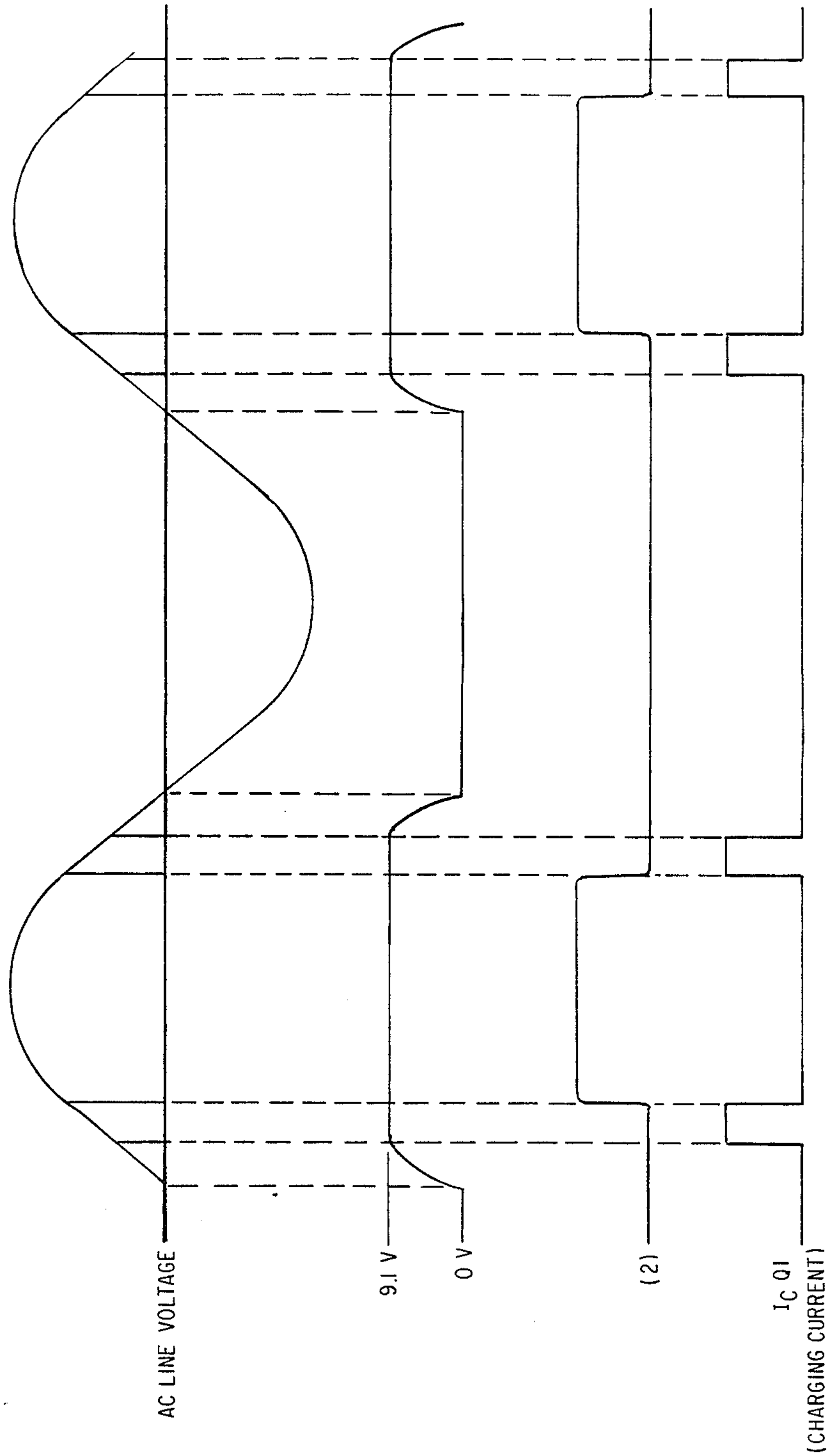
FIG. 4 illustrates the voltage and current waveforms existing in a particular operating mode.

The operation of the invention is described as follows:

The rectifier circuit 10 of FIG. 1 is shown in FIG. 3 as a diode $D_2$. In another embodiment, it may be desireable to utilize a full wave rectifier implemented perhaps as a bridge network. For purposes of the present invention it is preferred but not required that a rectifying circuit be utilized.

Figure 2:
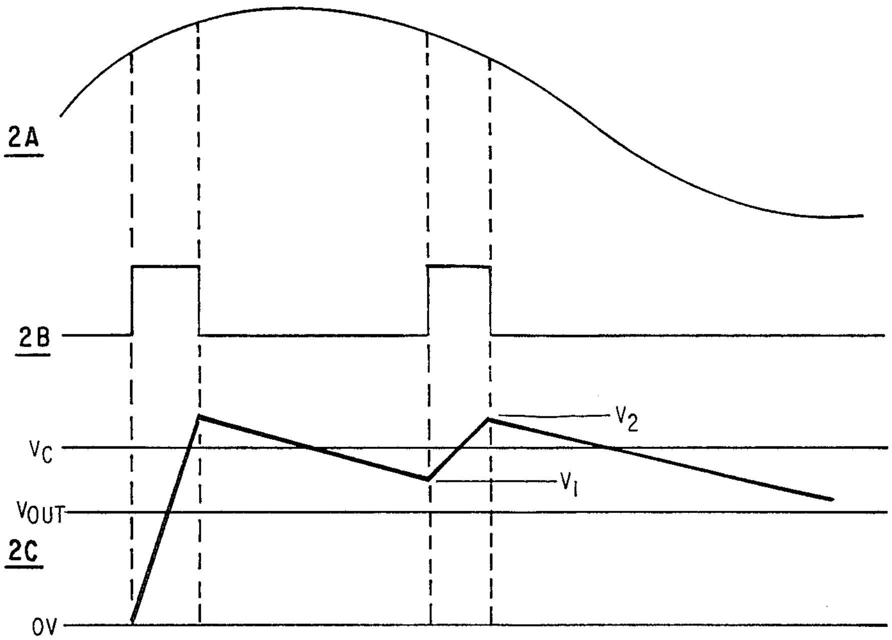
FIGS. 2*a*–2*c* illustrate the voltage and current waveforms existing in the circuitry of the invention in one mode of operation.

For ease of explanation, all potentials will be with respect to capacitor low, Node $C_L$, unless otherwise stated. The (on-off) operation of S1 is shown conceptually in FIG. 2B. S1 is designed to sense the voltage difference between the potential at the capacitor terminal $C_H$ and a pre-determined set value (in this case, the potential at the base of $Q_3$). Whenever this voltage difference falls below a certain value, say 1.3 volts (in this case, the sum of the voltage drops across $D_1$ and $V_{BE}$ of $Q_2$ or the gate to cathode turn on voltage of $SCR_1$), S1 is made to close, connecting the capacitor high terminal to the line. This condition is maintained until the current $I_C$ charges the capacitor to the prescribed value, $V_2$, (in this case, the zener equivalent voltage of $Z_1$ plus the voltage on node A.) Then S1 is turned off until the AC source again passes the voltage where $Q_4$ stops conducting and the base of $Q_3$ is 2 $V_{BE}$ above Cap-High ($C_H$), where again, the switch S1 is turned on. When the voltage of the AC source drops to the point that no current flows through S1, then switch S1 is again turned off. This of course is the direct result of the characteristics of a GTO thyristor which turns off in response to the cessation of current flow through the circuit.

As can be seen, the circuitry of the invention provides for the connection of the capacitor High, $C_H$, to the AC line voltage only during the time when the line voltage is at a safe voltage level relative to the desired output voltage. Thus destructive currents do not flow. This technique provides high switching efficiency due to the low voltage appearing across S1 during charging periods and hence the low power consumption by the switching circuitry. As shown in FIG. 3, the switch cell S1 is made up of $Q_1$, $Q_2$, $R_3$ and $R_4$, which are connected to form an SCR. Node 3 is the anode, Node 4 is the gate and Node 5 is the cathode. The composite SCR is designed to operate as a gate turn-off SCR (GTO).

Turn on of $S_1$ is performed by driving a current through $R_1$ and $D_1$ and into Node 4 and through the BE junction of $Q_2$. The collector current of $Q_2$ drives $Q_1$ which adds to the base drive of $Q_2$. The multiplication effect continues until both devices are saturated, and the voltage drop across the switch goes to approximately 1 $V_{BE}+V_{CE}$(Sat). This causes regeneration to begin, and it is selfsustaining. Turn-off is accomplished by pulling current out of Node 4, through $Q_3$, which interrupts the selfsustaining current multiplication and first, $Q_2$ turns off, followed by $Q_1$, which causes the switch to go to the off state. Again, as soon as current stops flowing through the gate of the GTO SCR (from node 4) the device turns off.

On-Off control of the GTO SCR is performed by the turn-off threshold circuit consisting of $R_1$, $Z_1$, $D_1$, and $Q_3$. When the AC line voltage rises to the point where approximately 10 ua passes through $R_1$, Diode $D_1$ is forward biased, and $Q_3$ is initially off. The 10 ua current turns S1 to the on-state and passes charging current $I_c$ to the 200 uf capacitor, and also to the load. Resistor $R_3$ and $R_4$ in the switch circuit form a current limiter which limits the current into the capacitor to a safe value.

Turn off is accomplished at the point when $Z_1$ reaches its zener value, and sinks a current through $Q_3$ base, turning it on. Turning on $Q_3$ diverts the current through $Q_1$ collector around $Q_2$, and the switch cell $S_1$ turns off as described previously.

If the previous circuit were left to itself, the on-off cycling of S1 would permit very high power dissipation in the switch cell whenever the line voltage was significantly higher (say 10V) than the capacitor voltage. To avoid this undesirable power dissipation, a lockout circuit consisting of $Q_4$, $R_2$, $R_5$, and $Z_2$ is provided for the purpose of constraining the on-state switching of the SCR (S1) to a safe operating range of incoming line voltage. When $Q_4$ is conducting (through $R_2$ and $Z_2$), $Q_3$ is on and $Q_1$ collector current is diverted away from $Q_2$ base. (i.e. S1 to the off state). It should be obvious that whenever the voltage difference between Nodes 2 and 3 exceeds the combined voltage drops of $VR_2$ and $VZ_2$ current will flow through $Z_2$ and into the base of $Q_4$ turning it on. Therefore, whenever the voltage difference between the AC line and the capacitor exceeds this voltage, the GTO SCR is forced to be in the off state. For purposes of this description of the invention, the term "lock out voltage" refers to the potential difference between the AC line and the capacitor or other charge storage means. This voltage is selected such that destructive current does not flow from the AC line to the charge storage means so long as the lockout voltage is not exceeded.

The circuit shown in FIG. 3 was constructed in the lab using the device values shown. The intent was to demonstrate the use of the invention to form a complete power supply that will deliver 5 V at 50 ma directly from a 120 VAC line.

The switching pre-regulator (comprising switch cell S1, the SCR drive circuit, and lockout circuit) charges the capacitor to an unregulated output that varies from 7 V to 9 V at Node A. The linear post-regulator provides a constant 5 V at terminal B (Power Supply Output).

Resistor $R_5$ sets the current through $R_2$ and $Z_2$ which in turn sets the maximum voltage that appears across S1 before the switch cell is turned off.

An increase in $R_5$ causes a decrease in current, which corresponds to shutting the GTO earlier in the cycle. A decrease in $R_5$ corresponds to lengthening the conductive angle until the GTO drive circuit takes over. Further decrease in $R_5$ will allow multiple conduction angles to occur in each half cycle of line voltage.

Figure 5:
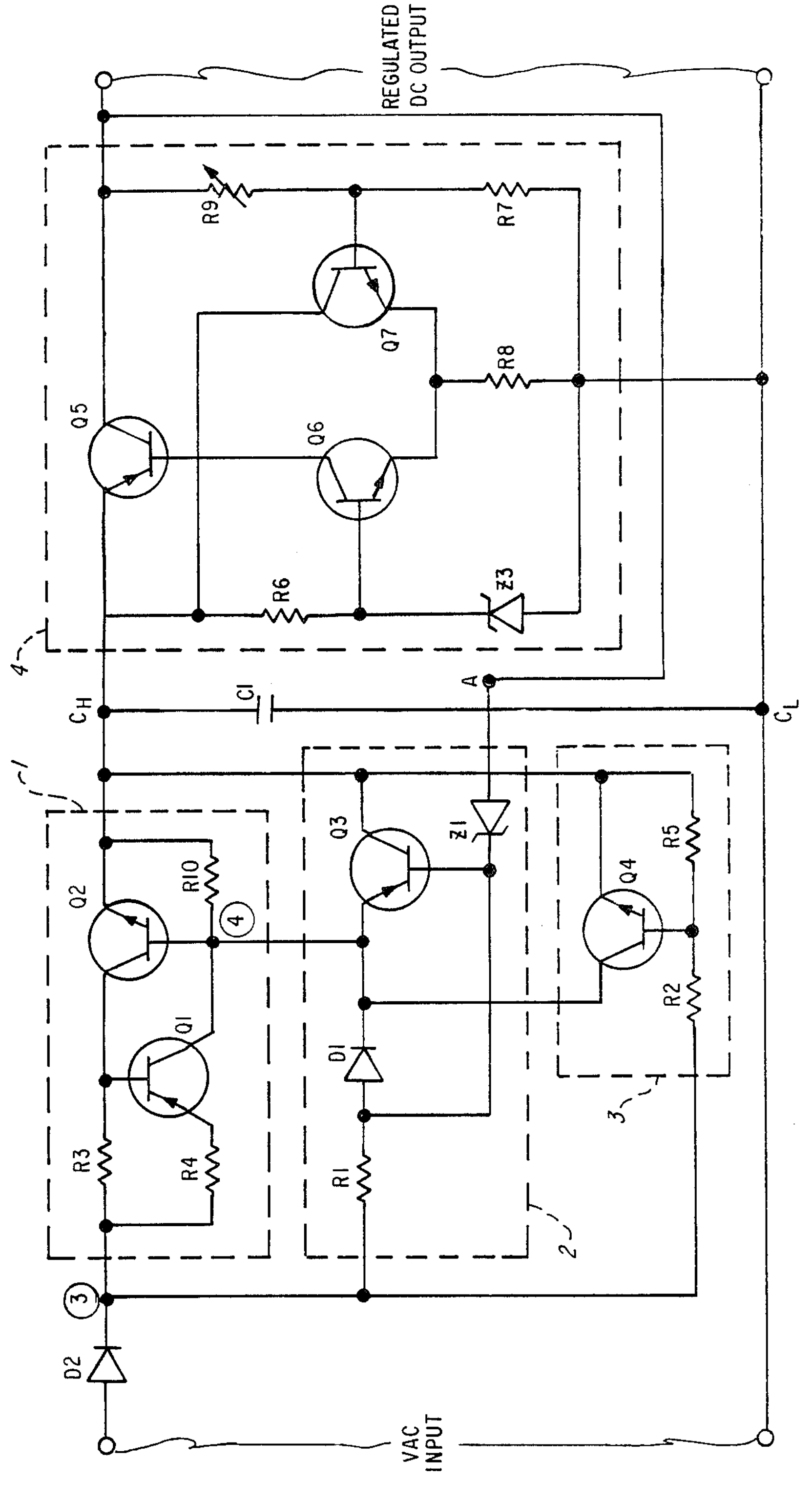
FIG. 5 is a schematic of another embodiment at the invention.

The second embodiment of the invention is illustrated in FIG. 5 which differs from FIG. 3 in that Node 6 has been connected to Node Cap-Hi, resistor $R_{10}$ in FIG. 5 has been added in parallel with the base emitter junction of $Q_2$ in FIG. 3 and the anode of zener diode $Z_1$ is connected to the DC high output rather than to the AC low input as it was in FIG. 3. In the circuit of FIG. 5, $Z_2$ is omitted. With respect to the voltage regulator stage, FIG. 5 shows a variable voltage supply.

In operation, this circuit differs from that in FIG. 3 in that the connection of node 6 and $Z_1$ to the DC high output will obviate the need for the separate $Z_2$. Thus, the base of $Q_4$ is connected through $R_2$ (omitting $Z_2$) to the rectified AC high line at node 3. As a result of the connection of node 6 to the DC high output, the voltage regulation function of the pre-regulator is activated whenever $C_1$ is not sufficiently above the existing output voltage.

Connection in this manner forces the voltage that appears across $C_1$ to "track" the output voltage in a way that maintains the voltage across $Q_5$ collector to emitter to be equal to the zener voltage $V_z$. This connection allows the voltage stored on the capacitor $C_1$ to "track" the output voltage set by resistors $R_9$ and $R_7$ by an amount ($V_{z1}$) sufficient to keep $Q_5$ out of saturation. This feature of this connection is that only 1 voltage selection means that sets the final DC output, is used to also set the voltage pre-regulator output appearing across $C_1$.

While the present invention has been described with repsect to a specific manner of practicing the invention, it is intended that the following claims shall be interpreted in accordance with the full scope of the underlying invention including any and all variations thereof which might be suggested or obvious to those skilled in the art.

What is claimed is:

1. A regulator of a high efficiency switching power supply suitable for direct connection between and AC line and a charge storage means comprising:
   - a switching means having an input coupled to said AC line and an output coupled to said charge storage means,
   - wherein said switching means inhibits current flow from said AC line to said charge storage means when said switching means is opened,
   - wherein said switchng means includes a biasing means for opening said switching means when said voltage at the charge storage means is greater than the voltage of a first predetermined reference voltage, and
   - when said voltage at said AC input line is greater than a second predetermined reference voltage, and
   - when said voltage at said AC input line is less than the voltage at said charge storage means,
   - wherein said switching means further includes a gate turn off SCR having an input connected to said AC line, an output terminal connected to said charge storage means, and a control terminal.

2. The regulator of claim 1, wherein said gate turn off SCR includes a PNP and an NPN transistor, and a first and a second resistor, said PNP transistor having a base connected to a collector of said NPN transistor and to said AC line via said first resistor, a collector connected to a base of said NPN transistor, and an emitter coupled to said AC line via said second resistor, said NPN transistor further having its emitter connected to said charge storage means.

3. The regulator of claim 1, wherein said biasing means includes a threshold gating means connected to said control terminal of said SCR and connected between said AC line and said charge storage means for providing said first predetermined reference voltage for biasing said gate turn off SCR in response to said reference voltage.

4. The regulator of claim 3, wherein said biasing means further includes a lockout circuit means connected to said control terminal of said SCR and between said AC line and said charge storage means for providing said second predetermined reference voltage and for biasing said gate turn off SCR in response to said reference voltage.

5. An integrated AC to DC converter for direct connection to a high voltage AC line comprising:
   - a rectification means,
   - a voltage preregulator comprising a GTO-SCR having an anode connected to said rectification means and a cathode connected to both of a voltage post regulator and a charge storage means,
   - a zener diode having its anode connected to a regulated DC output terminal of said post regulator and its cathode connected to the anode of a diode having its cathode connected to a gate of said GTO-SCR,
   - a PNP transistor having its emitter connected to said gate of said GTO-SCR, and having is collector connected to said cathode of said GTO-SCR and its base connected to said cathode of said zener diode,
   - an NPN transistor having its collector connected to said base of said PNP transistor, and having its emitter connected to said collector of said PNP transistor and having its base connected to said rectification means and to said cathode of said GTO-SCR, and
   - a first resistor connected between said rectifying means and said cathode of said diode.

6. A switching power supply on a single semiconductor chip suitable for direct connection between a first and second terminal of an AC source and a high and low side of a charge storage means, said power supply comprising:
   - a switching means having an input connected to said first terminal of said AC source for receiving an input signal, an output connected to said high side of said charge storage means for providing said input signal to said charge storage means when said switch is closed, and a control terminal for controllng said switch;
   - a threshold gating means connected between said first terminal of said AC source and said high side of said charge storage means and connected to said control terminal of said switching means for closing said switching means when a voltage on said first terminal of said AC source is greater than a voltage at said high side of said charge storage means, and opening said switching means when said voltage at said charge storage means is greater than a first predetermined reference voltage; and
   - a lockout means coupled between said first terminal of said AC source and said threshold means for opening said switching means when said voltage on said first terminal of said AC source is greater than a second predetermined reference voltage wherein said switching means includes a first PNP and first NPN transistor, said first PNP transistor having a base connected to a collector of said first NPN transistor and to said first side of said AC source, a collector connected to a base of said first NPN transistor, and an emitter coupled to said first side of said AC source, said first NPN transistor further having its emitter connected to said high side of said charge storage means.

7. The power supply of claim 6, wherein said gate turn off SCR further includes a first and second current limiting resistor, said first resistor coupled between said first side of said AC source and said collector of said PNP transistor and said second resistor coupled between said first side of said AC source and the emitter of said PNP transistor.

8. The power supply of claim 6, further including a post voltage regulator means coupled between said high and low side of said charge storage means, said post regulator having an output for providing a regulated output voltage.

9. The power supply of claim 8, wherein said threshold gating means includes a current path from said first side of said AC source to said base of said first NPN transistor via a third resistor and a first diode, a second PNP transistor having its emitter connected to both the base of said first NPN transistor and to a cathode of said first diode, its collector connected to said high side of said charge storage means and its base to an anode of said first diode, and a first zener diode having its cathode connected to said base of said second PNP transistor and its anode connected to said output of said post regulator means, wherein said first predetermined reference voltage is derived from said regulated output voltage and a reverse breakdown zener voltage.

10. The power supply of claim 9, wherein said lockout means includes a second NPN transistor having its collector coupled to said anode of said first diode, its emitter connected to said high side of said charge storage means, and its base connected to said high side of said AC source via a fourth resistor and to its emitter via a fifth resistor, wherein said second predetermined reference voltage is derived from the voltage across the fifth resistor.

11. The power supply of claim 6, further comprising a rectifying means connected between said high side of said AC source and said input of said switch means.

12. A voltage regulator of a high efficiency switching power supply on a single semiconductor chip switch suitable for direct connection to an AC line comprising:

a switching means for providing a connection of said AC line to a charge storage means, wherein said switch means includes an input connected to the AC line for receiving an input signal, an output connected to said charge storage means, and a control terminal, wherein said switching means provides said input signal to said charge storage means when said switch is biased on and inhibits said input signal from passing to said charge storage means when said switch is biased off, a voltage protection means including means for providing a first predetermined reference voltage and means for providing a second reference voltage, said voltage protection means being connected to said control terminal and between said AC line and said charge storage means for biasing said switching means to be off when a voltage across said charge storage means is greater than a first predetermined reference voltage or when said voltage at said AC line is greater than said second predetermined reference voltage, and a current protection means connected between said AC line and said switching means for detecting an input current from said AC line and biasing said switching means to be off when said current is greater than a predetermined magnitude.

13. The regulator of claim 12, wherein said switching means includes a gate turn off SCR.

14. The regulator of claim 13, wherein said gate turn off SCR includes a first NPN transistor having its collector coupled to said AC line, its emitter connected to said charge storage means and its base connected to said voltage protection means and a first PNP transistor having its collector connected to said base of said first NPN transistor, its emitter connected to said AC line, and its base connected to said collector of said first NPN transistor.

15. The regulator of claim 14, further including a voltage post regulator connected between said charge storage means and an output, for providing a substantially regulated selected voltage at said output.

16. The regulator of claim 15, wherein said means for providing said first predetermined reference includes a second PNP transistor having its collector collected to said charge storage means, its emitter connected to said base of said first NPN transistor, and its base connected to a first side of said AC line via a first transistor; a first diode having its cathode connected to said emitter of said second PNP transistor and its anode connected to said base of said second PNP transistor; and a first zener diode having its cathode connected to said AC line via said first resistor and its anode connected to said output of said voltage post regulator.

17. The regulator of claim 16, wherein said voltage post regulator includes a third PNP transistor having its emitter connected to a first terminal of said charge storage means, its collector to said output and its base to a third NPN transistor, said third transistor having its base connected to said emitter of said third PNP transistor via a second resistor and to a cathode of a second zener diode, and its emitter coupled to an emitter of a fourth NPN transistor and to a second terminal of said charge storage means via a third resistor, said fourth NPN transistor having its collector connected to said emitter of said third PNP transistor and its base connected to said second terminal of said charge storage means via a fourth resistor, and to said output via an adjustable resistor.

18. The regulator of claim 16, wherein said means for providing said second predetermined reference voltage includes a second NPN transistor having its collector connected to said AC line via a second resistor, its emitter connected to said AC line via a third resistor and its base connected to its emitter via a fourth resistor.

19. A high efficiency switching power supply having an input for receiving an AC signal and an output for providing a regulated DC signal, said switching power supply comprising:

a regulator connected between said input and a charge storage means, and a post regulator connected between said charge storge means and said output, wherein said regulator includes a switching means having a first terminal connected to said input, a second terminal connected to said charge storage means, and a control gate terminal, wherein said switching means provides a conductive path between said input and said charge storage means when said switching means is biased on; and a biasing means having a first means for producing a first predetermined reference voltage and a second means for producing a second predetermined reference voltage, said biasing means is connected to said control gate terminal and between said input and said output for biasing said control gate terminal for biasing said switching means on when an AC voltage at said input is greater than said voltage across said charge storage means, and said AC voltage is less than said first predetermined reference voltage, and said voltage across said charge storage means is less than said second predetermined reference voltage, and wherein said output of said post regulator is connected to said second means for producing said second predetermined reference voltage, whereby said voltage at the output of the regulator tracks the voltage across the charge storage means.

20. The power supply of claim 19, wherein said switching means includes a gate turn off SCR.

21. The power supply of claim 19, wherein said biasing means includes a first zener diode, a second diode, and a three terminal switch, said three terminal switch having a first terminal connected to said control gate terminal of said switching means, and a cathod of said second diode, a second terminal connected to said charge storage means, and a control terminal connected to said input via a resistor and to a cathode first zener diode, said first zener diode having its anode connected to said output, wherein said three terminal switch is operative to divert current from said control terminal of said switching means and thereby cause said switching means to cease conducting in response to an AC line potential exceeding a voltage equal to a regulated output DC voltage plus said first zener diode reverse breakdown voltage.

22. The power supply of claim 21, wherein said post regulator includes a means for selecting the magnitude of the regulated output DC voltage, wherein said post regulator in combination with said first zener diode provides a selected DC output while dissipating substantially the same power across it independent of the magnitude selected for said regulated output DC voltage.

* * * * *